United States Patent
Nakagawa

(10) Patent No.: US 12,391,268 B2
(45) Date of Patent: Aug. 19, 2025

(54) DRIVER ASSIST SYSTEM

(71) Applicant: TOYOTA JIDOSHA KABUSHIKI KAISHA, Toyota (JP)

(72) Inventor: Yuki Nakagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 18/121,820

(22) Filed: Mar. 15, 2023

(65) Prior Publication Data

US 2023/0294724 A1    Sep. 21, 2023

(30) Foreign Application Priority Data

Mar. 17, 2022   (JP) ................................ 2022-042557

(51) Int. Cl.
*B60W 50/14*     (2020.01)
*B60W 30/095*    (2012.01)

(52) U.S. Cl.
CPC ........ *B60W 50/14* (2013.01); *B60W 30/0956* (2013.01); *B60W 2050/146* (2013.01); *B60W 2554/4041* (2020.02); *B60W 2554/802* (2020.02); *B60W 2554/805* (2020.02)

(58) Field of Classification Search
CPC .................................................. B60W 50/14
See application file for complete search history.

(56) References Cited

U.S. PATENT DOCUMENTS

| | | | | |
|---|---|---|---|---|
| 5,739,901 A | * | 4/1998 | Fujioka | G01S 7/4865 356/5.01 |
| 5,818,355 A | * | 10/1998 | Shirai | B60K 28/10 340/904 |
| 5,970,433 A | * | 10/1999 | Oka | G05D 1/0272 398/151 |
| 6,150,932 A | * | 11/2000 | Kenue | B60Q 9/008 340/904 |
| 6,326,887 B1 | * | 12/2001 | Winner | B60Q 9/007 180/199 |
| 2007/0288133 A1 | * | 12/2007 | Nishira | B62D 15/0265 701/23 |
| 2018/0268702 A1 | * | 9/2018 | Morotomi | G08G 1/166 |
| 2021/0155260 A1 | * | 5/2021 | Wang | B60W 30/0956 |
| 2023/0243962 A1 | * | 8/2023 | Bui-Van | G01S 13/931 |

FOREIGN PATENT DOCUMENTS

| | | |
|---|---|---|
| DE | 102010023164 A1 | 12/2011 |
| JP | 2001-347853 A | 12/2001 |
| JP | 2016-224553 A | 12/2016 |
| KR | 2016-0055515 A | 5/2016 |

* cited by examiner

*Primary Examiner* — Davetta W Goins
*Assistant Examiner* — Pameshanand Mahase
(74) *Attorney, Agent, or Firm* — Dinsmore & Shohl LLP

(57) ABSTRACT

A driver assist system configured not to provide wrong information about a distance to an obstacle without using map data. A controller of the driver assist system comprises: a linear distance calculator that calculates a linear distance from to the obstacle; an estimator that estimates that an actual distance to the obstacle is different from the linear distance; and an information delivery inhibitor that inhibits provision of the information about a distance to the obstacle to the driver, if the estimator estimates that the actual distance is different from the linear distance.

9 Claims, 6 Drawing Sheets

DRIVER ASSIST SYSTEM

CROSS REFERENCE TO RELATED APPLICATIONS

The present disclosure claims the benefit of Japanese Patent Application No. 2022-042557 filed on Mar. 17, 2022 with the Japanese Patent Office, the disclosure of which are incorporated herein by reference in its entirety.

BACKGROUND

Field of the Disclosure

Embodiments of the present disclosure relate to the art of a driver assist system configured to assist a driver to operate a vehicle easily by providing peripheral information to alert to the driver.

Discussion of the Related Art

In order to avoid the risk of accident such as a rear-end collision during manual operation of a vehicle, it is necessary for a driver to obtain information about existence and behaviors of other vehicles. For example, JP-A-2001-347853 describes a display device arranged in a vehicle to convey road information to a driver. According to the teachings of JP-A-2001-347853, the road information including information about a traffic congestion, a road surface condition, an existence of a traffic light, etc., is collected through a road-to-vehicle communication, and conveyed to the driver through the display. For example, the existence of obstacles is detected by a RADER, and when the obstacle exists within a predetermined distance from the vehicle, the indication of road information is turned off.

JP-A-2016-224553 also describes a traffic information display system that indicates traffic information including information about a traffic accident on a driving route. According to the teachings of JP-A-2016-224553, the information indicated in the display is emphasized with the increase of a speed of the vehicle headed to the accident site or the approach to the accident site.

By thus collecting the information about the obstructive factors such as information about a traffic congestion and a falling object on a road, the driver is allowed to prepare for such obstructive factors in advance. To this end, the displays described in the foregoing prior art documents may be utilized effectively. However, the information about the other vehicles has to be conveyed to the driver not only timely but also in detail. For this purpose, it is necessary to obtain a distance to the traffic congestion or the obstacle on a road in a traveling direction of the vehicle.

According to the teachings of JP-A-2001-347853 and JP-A-2016-224553, the information about the driving road is collected with reference to a map data. However, the traffic accident may occur and the object may exist on a road where data thereof is not available in the map data. That is, such information is not indicated in the displays taught by JP-A-2001-347853 and JP-A-2016-224553, and hence the driver may not be assisted effectively by those displays. Specifically, the information about the driving road may be obtained through an inter-vehicle communication and the road-to-vehicle communication, and the positional information may be obtained through a GPS (i.e., a Global Positioning System). However, if the data about the driving road is not available in the map data, a linear distance from the vehicle to the obstructive factor is calculated as the distance to the obstructive factor in the traveling direction of the vehicle.

The driving road to the obstructive factor is not always a straight road, and an actual distance to the obstructive factor on the driving road may be longer than the calculated linear distance. If such linear distance to the obstructive factor is indicated on the displays, the distance conveyed to the driver may be shorter than the actual distance to the obstructive factor. That is, misinformation is provided to the driver. Such disadvantage may occur even in a vehicle having the GPS, but also in a vehicle without having the map information.

SUMMARY

Aspects of the present disclosure have been conceived noting the foregoing technical problems, and it is therefore an object of the present disclosure to provide a driver assist system configured not to provide a driver with wrong information about a distance to an obstructive factor located ahead of a vehicle, without using map data.

According to one aspect of the present disclosure, there is provided a driver assist system that provides a driver of a vehicle to which the driver assist system is applied with information about existence of an obstacle being located ahead of the vehicle and whose positional information can be detectable. In order to achieve the above-explained the driver assist system is provided with a controller that controls provision of the information to the driver. Specifically, the controller comprises: a linear distance calculator that calculates a linear distance from the vehicle to the obstacle based on positional information of the vehicle and positional information of the obstacle; an estimator that estimates that an actual distance from the vehicle to the obstacle is different from the linear distance; and an information delivery inhibitor that inhibits provision of the information about a distance from the vehicle to the obstacle to the driver, if the estimator estimates that the actual distance is different from the linear distance.

In a non-limiting embodiment, the estimator may be configured to certify an estimation that the actual distance is different from the linear distance if an angle between an orientation of the vehicle and a straight line connecting the vehicle and the obstacle is equal to a reference angle or wider.

In a non-limiting embodiment, the estimator may be further configured to maintain the estimation that the actual distance is different from the linear distance until the linear distance is reduced shorter than a reference distance.

In a non-limiting embodiment, the obstacle may include other vehicle whose azimuth as an orientation thereof is detectable. In addition, the estimator may be further configured to certify an estimation that the actual distance is different from the linear distance if an angle between an azimuth of the vehicle and the azimuth of the obstacle is equal to a reference angle or wider.

In a non-limiting embodiment, the estimator may be further configured to certify an estimation that the actual distance is different from the linear distance if the linear distance is equal to a reference distance or longer, and a change in a running condition of the vehicle exceeds a criterion.

In a non-limiting embodiment, the change in the running condition may include a change in an azimuth of the vehicle, a change in a speed of the vehicle, the number of operations or frequency of operations of a steering wheel, and the number of operations or frequency of operations of a blinker.

According to the exemplary embodiment of the present disclosure, the information about the obstacle including other vehicle stopping for some reason, a construction site, etc., located ahead of the vehicle is provided phonically or visually to the driver. To this end, the linear distance from the vehicle to the obstacle is calculated by comparing the positional information of the vehicle with the positional information of the obstacle. In a case that the orientation of the vehicle is oriented to a direction different from a direction toward the obstacle, the estimator estimates that an actual distance from the vehicle to the obstacle is different from the calculated linear distance. In this case, the information about the existence of the obstacle is provided to the driver, but the provision of the information about the distance to the obstacle is inhibited. That is, the linear distance to the obstacle may be different significantly from the actual distance in this case. In addition, since the map data is not available, an accurate distance to the obstacle may not be obtained. Therefore, in order not to provide wrong information about the distance to the obstacle to the driver, the provision of the information about the distance to the obstacle is inhibited. For this reason, the driver will not be assisted erroneously to operate the vehicle.

As described, the provision of the information about the distance to the obstacle is inhibited in the situation where the linear distance to the obstacle is still equal to the reference distance or longer. Such inhibition of the information is cancelled when the linear distance to the obstacle is reduced shorter than the reference distance so that information about the distance to the obstacle is provided to the driver. In this situation, a difference between the linear distance and the actual distance is small. That is, a difference between an expected time and an actual time to reach the obstacle is rather small. In this situation, therefore, the driver is provided with the information about the existence of the obstacle located at close range to be assisted to operate the vehicle easily.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION

Embodiments of the present disclosure will now be explained with reference to the accompanying drawings.

Note that the embodiments shown below are merely examples of the present disclosure, and do not limit the present disclosure.

According to the embodiment of the present disclosure, there is prodded a driver assist system 1 that provides information to a driver about an obstructive factor whose positional information is detectable and which is located ahead of a vehicle in a traveling direction. The information about the obstructive factor includes information about a vehicle(s) stopping due to e.g., a traffic congestion or a traffic accident, information about road debris, information about a construction site and so on. According to the exemplary embodiment of the present disclosure, therefore, the driver is allowed to prepare for such obstructive factors in advance. To this end, the driver assist system 1 is applied to a vehicle having a function to collect information about a position, a speed, an angle of traveling direction, etc., of itself, and detailed information about the obstructive factors. Specifically, the driver assist system 1 is configured to provide the information about the obstructive factor to the driver even if map data is not available in the vehicle to which the driver assist system 1 is applied (hereinafter, simply referred to as the vehicle). In other words, the driver assist system 1 is configured to provide the information about the obstructive factor to the driver without using the map data.

Figure 1:
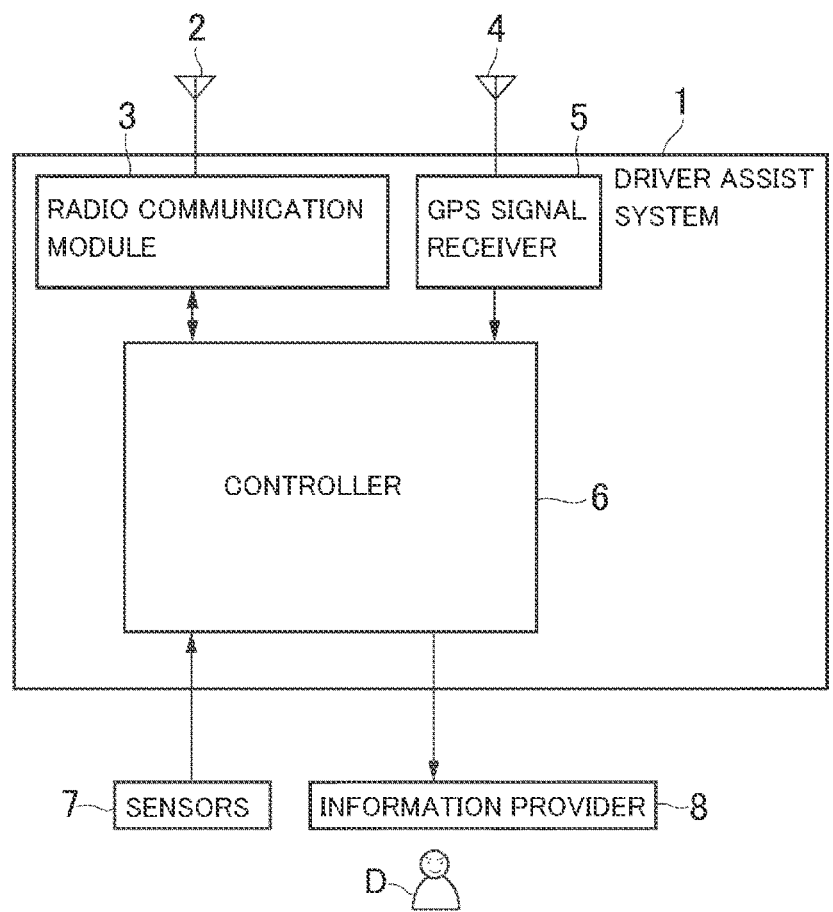
FIG. 1 is a block diagram showing a structure of a hardware of the driver assist system according to the exemplary embodiment of the present disclosure.

Referring now to FIG. 1, there is shown a structure of a hardware of the driver assist system 1. As shown in FIG. 1, the driver assist system 1 comprises a radio antenna 2, a radio communication module 3, a GPS (i.e., global positioning system) antenna 4 that receives a signal from a GPS satellite, a GPS signal receiver 5, and a controller 6. Various data about the vehicle collected by sensors 7 is transmitted to the controller 6, and various information is provided from an information provider 8 to a driver D.

Information is exchanged between the vehicle and other vehicle via the radio antenna 2, and also between the vehicle and an external communication device installed on a road via the radio antenna 2. For example, the external communication device includes an optical beacon, a radio beacon, a broadcasting device of a radio station, and a DSRC (i.e., Dedicated Short Range Communication) module.

The radio communication module 3 transmits signals to other vehicles and the external communication device through the radio antenna 2, and receives signals through the radio antenna 2. The signals received by the radio communication module 3 is demodulated by the radio communication module 3 and further transmitted to the controller 6.

The GPS signal receiver 5 receives GPS signals from GPS satellites through the GPS antenna 4, and transmit the incident signals to the controller 6 so that a current position of the vehicle (on a coordinate) is computed by the controller 6 based on the signals transmitted from the GPS satellites. Otherwise, a current position of the vehicle may also be computed based on an inertial navigation method by calculating a speed of the vehicle and a distance to a predetermined destination while determining a traveling direction by a gyroscope sensor.

The controller 6 collects information about positions (on a coordinate) and speeds of other vehicles thorough an inter-vehicle communication and a road-to-vehicle communication during propulsion. In addition, the controller 6 provides the information about positions and speeds of other vehicles as well as an existence of obstacle phonically or visually (i.e., imagery) to the driver D of the vehicle through the information provider 8. Therefore, the driver D is allowed to confirm current behavers of other vehicles during propulsion and to confirm the existence of the obstacle before reaching a site on which the obstacle exists. For this reason, the driver D is allowed to operate the vehicle safely in such a manner as to avoid the other vehicles and the obstacle.

Other kinds of information about the vehicle to which the driver assist system 1 is applied are collected by the sensors 7. To this end, the sensors 7 include a vehicle speed sensor, an acceleration sensor, a steering sensor, a yaw rate sensor, a gyroscope sensor, a brake sensor, an azimuth sensor, a blinker sensor and so on.

Figure 2:
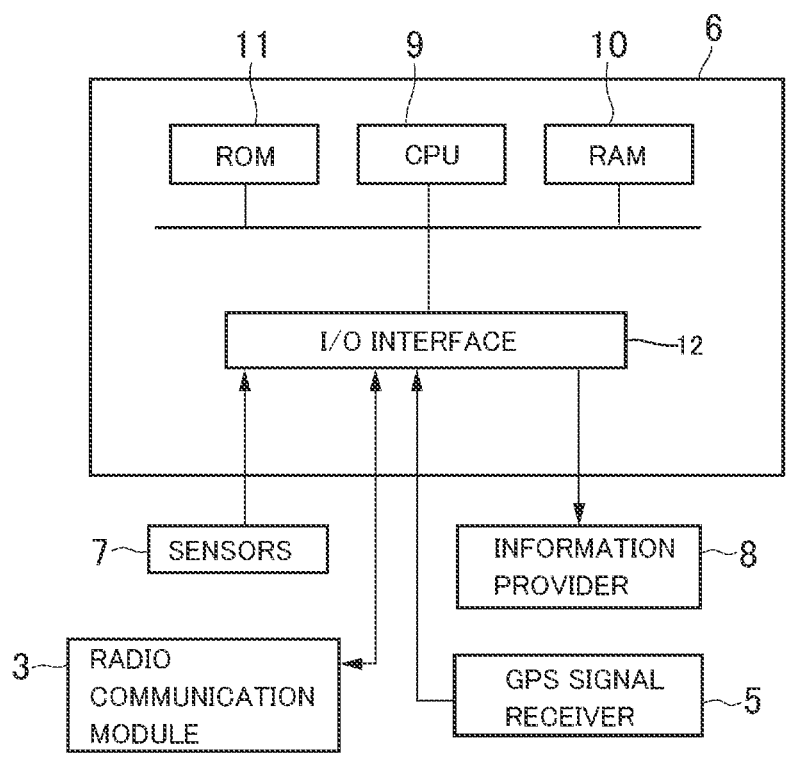
FIG. 2 is a block diagram showing a structure of a controller of the driver assist system according to the exemplary embodiment of the present disclosure.

The controller 6 comprises a microcomputer as its main constituent. Specifically, as schematically shown in FIG. 2, the controller 6 comprises a CPU 9, a RAM 10, a ROM 11, and an input-output interface 12.

The CPU 9 performs calculation with reference to programs stored in the ROM 11, and transmits a calculation result in the form of command signal to execute an intended control. Data about calculation results and interim calculation results by the CPU 9, that is, the data about the vehicle and the data about other vehicles are stored in the RAM 10.

Figure 3:
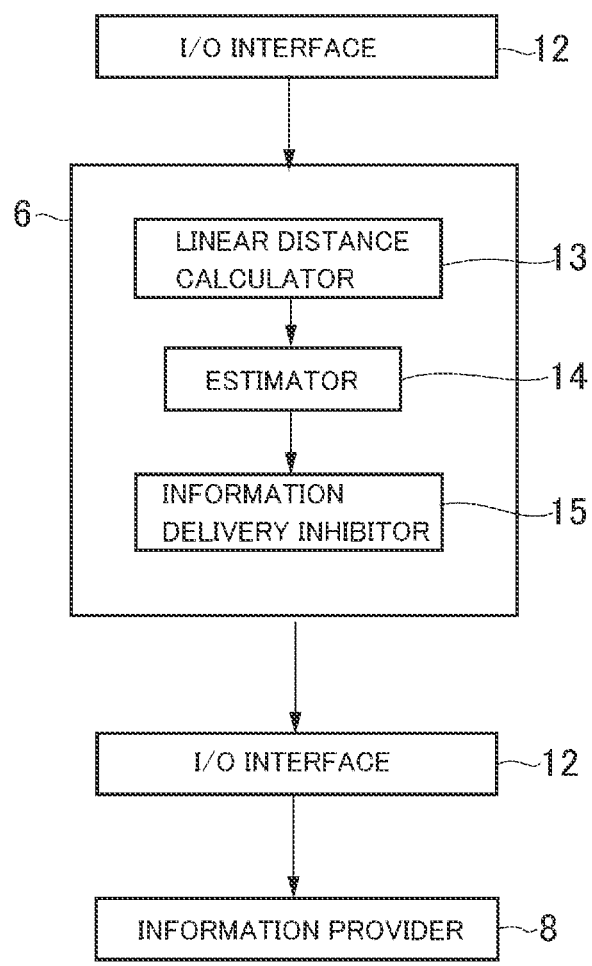
FIG. 3 is a block diagram showing functions of the controller.

The controller 6 is configured to execute an after-mentioned routine, and to this end, the controller 6 comprises the elements shown in FIG. 3.

The driver assist system 1 is configured to assist the driver to operate the vehicle by collecting information about obstacles existing ahead of the vehicle in the traveling direction, and providing the collected information to the driver. Hereinafter, an example to collect positional information (i.e., position coordinate) about a stalled vehicle will be explained. As shown in FIG. 3, the controller 6 comprises a linear distance calculator 13 that calculates a linear distance from the vehicle to the stalled vehicle. For example, the linear distance to the stalled vehicle may be calculated based on a coordinate value of the vehicle and a coordinate value of the stalled vehicle.

The controller 6 further comprises an estimator 14 that estimates that an actual distance from the vehicle to the stalled vehicle is different from the linear distance from the vehicle to the stalled vehicle. Given that the map data is not available, a traveling route from a current position of the vehicle to the stalled vehicle or the vicinity of the stalled vehicle may not be determined with reference to the map data. In this case, therefore, the distance from the current position of the vehicle to the stalled vehicle has to be determined as a geometrical linear distance. However, the traveling route of the vehicle to the stalled vehicle may not always be a straight route, and hence the actual distance from the vehicle to the stalled vehicle may be different from the linear distance from the vehicle to the stalled vehicle. Therefore, the estimator 14 is configured to estimate whether the actual distance from the vehicle to the stalled vehicle is different from the linear distance from the vehicle to the stalled vehicle.

As described, given that the map data is not available or not used, the traveling route from the current position of the vehicle to the stalled vehicle may not be determined with reference to the map data. In this case, therefore, the estimator 14 estimates whether the actual distance from the vehicle to the stalled vehicle is different from the linear distance from the vehicle to the stalled vehicle, based on the current and most recent information about the vehicle. For example, the estimator 14 estimates that the actual distance is different from the linear distance if an angle between an actual traveling direction (i.e., an orientation) of the vehicle and a straight line connecting the vehicle and the stalled vehicle is a predetermined angle or wider. In this case, the vehicle does not travel directly toward the stalled vehicle, that is, the vehicle temporarily travels in a direction different from the direction toward the stalled vehicle. Accordingly, the actual distance from the vehicle to the stalled vehicle differs from the linear distance from the vehicle to the stalled vehicle. In this situation, the vehicle may be oriented temporarily to the stalled vehicle on the route to the stalled vehicle. However, the linear distance will not be equalized or approximated to the actual distance by such temporal coincidence of the orientation of the vehicle and the direction to the stalled vehicle. In some embodiments, once the estimator 14 estimates that the actual distance is different from the linear distance, such estimation is maintained until the linear distance from the vehicle to the stalled vehicle is reduced shorter than a reference distance.

The estimator 14 may be further configured to estimate that the actual distance from the vehicle to the stalled vehicle is different from the linear distance from the vehicle to the stalled vehicle, if an angle between an azimuth of the vehicle and an azimuth of the stalled vehicle is a reference angle or wider under the condition where the linear distance from the vehicle to the stalled vehicle is the reference distance or longer. For example, if the vehicle and the stalled vehicle are positioned on the same straight line, the angle between the azimuth of the vehicle and the azimuth of the stalled vehicle is reduced to substantially zero. In this case, the actual distance from the vehicle to the stalled vehicle and the linear distance from the vehicle to the stalled vehicle are substantially equalized to each other. By contrast, if the azimuth of the vehicle is significantly different from the azimuth of the stalled vehicle, the vehicle will not travel directly toward the stalled vehicle, and will temporarily travel in a direction different from the direction toward the stalled vehicle. That is, the road to the stalled vehicle curves with respect to the straight line connecting the vehicle and the stalled vehicle. Therefore, if the angle between the azimuth of the vehicle and the azimuth of the stalled vehicle is the reference angle or wider, the estimator 14 estimates that the actual distance from the vehicle to the stalled vehicle is different from the linear distance from the vehicle to the stalled vehicle. To this end, the reference angle may be set taking account of a road width and the number of lanes.

The estimator 14 may be further configured to estimate that the actual distance from the vehicle to the stalled vehicle is different from the linear distance from the vehicle to the stalled vehicle, if a change in a running condition of the vehicle exceeds a criterion under the condition where the linear distance from the vehicle to the stalled vehicle is the reference distance or longer. In the exemplary embodiment of the present disclosure, definition of the "change in the running condition" is that the vehicle is not traveling stably in a straight line or that the vehicle has not been traveling stably in a straight line. For example, a steering wheel and an accelerator pedal (neither of which are shown) are operated repeatedly when the vehicle travels on a winding road, and a blinker (not shown) is operated every time the vehicle takes a turn at an intersection. That is, if an azimuth, a steering angle, a yaw rate, a speed, or an acceleration of the vehicle is changed, the vehicle may be considered to be traveling on a curved road. Likewise, if the blinker is operated, the vehicle may be considered to be taking a turn at an intersection. According to the exemplary embodiment of the present disclosure, such change in the running condition is compared to a criterion, and the estimation that the actual distance from the vehicle to the stalled vehicle is different from the linear distance from the vehicle to the stalled vehicle is certified if the change in the running condition exceeds the criterion. To this end, the criterion of the change in the running condition includes: a criterion value of a change in an azimuth, a steering angle, or a yaw rate of the vehicle; a criterion value of an accumulated value of a change in an azimuth, a steering angle, or a yaw rate of the vehicle within a predetermined period of time; a criterion value of a change in a speed or an acceleration of the vehicle; a criterion value of an accumulated value of a change in a speed or an acceleration of the vehicle within a predetermined period of time; and a criterion value of the number of operations of the blinker within a predetermined period of time.

The controller 6 further comprises an information delivery inhibitor 15 that controls contents of the information to be provided from the information provider 8 to the driver. Specifically, the information delivery inhibitor 15 is configured to: inhibit provision of the information about a distance from the vehicle to the stalled vehicle to the driver, if the estimator 14 estimates that the actual distance from the vehicle to the stalled vehicle is different from the linear distance calculated by the linear distance calculator 13; and cancel the inhibition of (i.e., permit) provision of the information about the above-mentioned distance, if e.g., the linear distance is reduced shorter than the reference distance and hence the estimation made by the estimator 14 is no longer certified.

In order not to provide wrong information about the distance to the stalled vehicle to the driver, the driver assist system 1 according to the exemplary embodiment of the present disclosure is configured to provide the information about the stalled vehicle by the following procedures.

Figure 4:
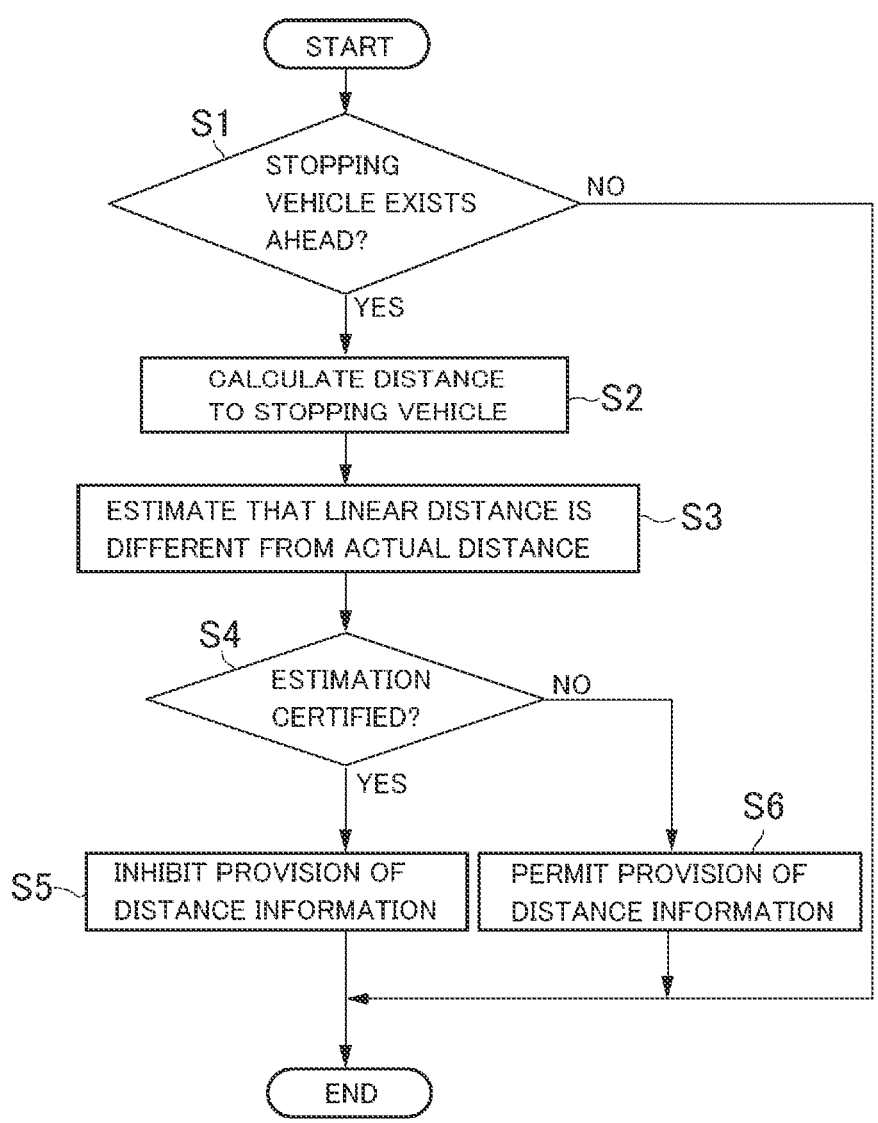
FIG. 4 is a flowchart showing one example of a routine executed by the controller.

Turning to FIG. 4, there is shown one example of a routine executed by the controller 6 so as to provide the information about a distance to the stalled vehicle to the driver. At step S1, it is determined whether other vehicle having a function to exchange information with the vehicle exists ahead of the vehicle in the traveling direction. For example, if other vehicle having a function to exchange information with the vehicle is stalled ahead of the vehicle in the traveling direction, the answer of step S1 will be YES. By contrast, if there is no stalled vehicle ahead of the vehicle in the traveling direction, the answer of step S1 will be NO. For example, the existence of the stalled vehicle may be determined based on the positional information of other vehicles contained in the information about other vehicles obtained through the inter-vehicle communication or the road-to-vehicle communication. That is, if the information about other vehicles may not be obtained, or if the stalled vehicle is not located ahead of the vehicle, the answer of step S1 will be NO. By contrast, if the stalled vehicle exists ahead of the vehicle in the traveling direction, the answer of step S1 will be YES.

In the case that the answer of step S1 is NO, no information to assist the driver to operate the vehicle is available. In this case, therefore, the routine returns. By contrast, in the case that the answer of step S1 is YES, the routine progresses to step S2 to calculate a distance from the vehicle to the stalled vehicle based on the positional information (i.e., position coordinate) of the stalled vehicle contained in the information about other vehicles and the positional information (i.e., position coordinate) of the vehicle. Specifically, a linear distance from the vehicle to the stalled vehicle is calculated by the linear distance calculator 13 at step S2 based on the position coordinates of the vehicle and the stalled vehicle.

Then, at step S3, the estimator 14 estimates that the actual distance from the vehicle to the stalled vehicle is different from the linear distance calculated by the linear distance calculator 13. Specifically, the estimator 14 estimates that the actual distance is different from the linear distance, if the linear distance calculated at step S2 is the reference distance or longer so that a first condition is satisfied, and if the vehicle is not oriented to the stalled vehicle (i.e., azimuth angles of the vehicle and the stalled vehicle are different) or if the vehicle is expected not to travel along the straight line connecting the vehicle and the stalled vehicle. As described, if an angle between the azimuth of the vehicle and the azimuth of the stalled vehicle is wide, the vehicle does not travel directly toward the stalled vehicle, and temporarily deviates from the straight line connecting the vehicle and the stalled vehicle. In this case, therefore, the estimation that the actual distance is different from the linear distance made by the estimator 14 is certified. In addition, if the vehicle turns repeatedly to the right and the left and hence the speed of the vehicle changes frequently, the road to the stalled vehicle from the current position of the vehicle is assumed to curve rightward and leftward. In this case, therefore, such estimation made by the estimator 14 is also certified. To this end, a numerous threshold value of the angle between the azimuth of the vehicle and the azimuth of the stalled vehicle or the number of operations of the steering wheel is set in advance. That is, the estimation made by the estimator 14 is certified if the angle between the azimuth of the vehicle and the azimuth of the stalled vehicle is wider than the threshold value, or if the number of operations of the steering wheel is greater than the threshold value.

Then, it is determined at step S4 whether the estimation made by the estimator 14 at step S3 is certified. If the estimation made by the estimator 14 at step S3 is certified so that the answer of step S4 is YES, the routine progresses to step S5 to inhibit the provision of the information about the distance from the vehicle to the stalled vehicle to the driver. In this case, the vehicle will have to travel longer distance to the stalled vehicle than the linear distance calculated at step S2. Therefore, if the linear distance calculated at step S2 as a wrong information is provided to the driver, the driver would be confused. In this case, therefore, the provision of the information about the distance to the stalled vehicle is inhibited by the information delivery inhibitor 15.

By contrast, if the estimation made by the estimator 14 at step S3 is not certified so that the answer of step S4 is NO, the routine progresses to step S6 to permit the provision of the information about the distance from the vehicle to the stalled vehicle to the driver. In this case, the vehicle is substantially oriented to the stalled vehicle, and hence the actual distance to the stalled vehicle is equal to or close to the linear distance calculated by the linear distance calculator 13. In other words, the linear distance calculated by the linear distance calculator 13 is not different significantly from the actual distance. In this case, since the relatively accurate information about the distance to the stalled vehicle can be provided to the driver, the linear distance calculated by the linear distance calculator 13 is provided to assist the driver.

In addition, if the distance from the vehicle to the stalled vehicle is reduced shorter than the reference distance so that the first condition is no longer satisfied, the answer of step S4 is also NO. In this case, therefore, the routine progresses to step S6 to provide the information about the linear distance calculated by the linear distance calculator 13 to the driver. To this end, for example, the reference distance may be set to a distance at which the stalled vehicle can be confirmed visually, or at which the vehicle can be stopped safely before reaching the stalled vehicle. In such a short distance, a difference between the linear distance calculated by the linear distance calculator 13 and the actual distance from the vehicle to the stalled vehicle is rather small. Therefore, the driver will not be confused by the information about the distance to the stalled vehicle even if the linear distance calculated by the linear distance calculator 13 is not provided to the driver.

Although the provision of the information about the distance from the vehicle to the stalled vehicle is inhibited at step S5, information other than the distance from the vehicle to the stalled vehicle, for example, information about other vehicles, an existence of the stalled vehicle, a reason of stoppage of other vehicle, a type of the stalled vehicle, etc., may be provided to the driver according to need.

Figure 5:
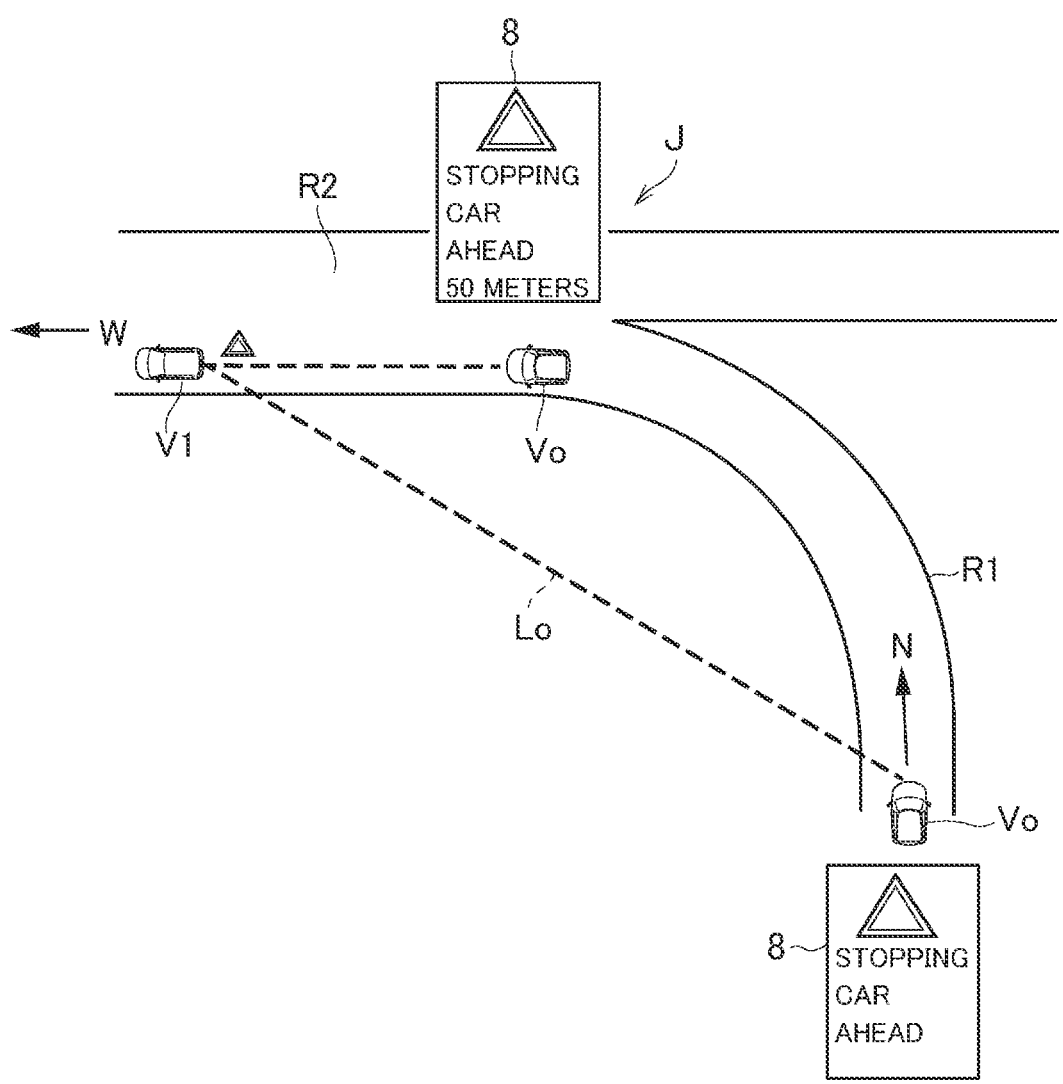
FIG. 5 is a schematic illustration showing an example of providing information about a distance to a stalled vehicle to a driver at a junction.

Here will be explained an example of a situation to provide the information about the distance from the vehicle to the stalled vehicle with reference to FIG. 5. Specifically, FIG. 5 shows an example in which an angle between the azimuth of the vehicle V0 to which the driver assist system 1 is applied and the azimuth of the stalled vehicle V1 is the reference angle or wider, in the situation where a linear distance L0 from the vehicle V0 to the stalled vehicle V1 is still the reference distance or longer. In the situation shown in FIG. 5, the azimuth of the vehicle V0 is N, and the azimuth of the stalled vehicle V1 is W. In this situation, the vehicle V0 will not travel directly toward the stalled vehicle V1. Specifically, the vehicle V0 will temporarily travel in a direction different from the direction toward the stalled vehicle V1, and then travel toward the stalled vehicle V1. That is, the actual distance from the vehicle V0 to the stalled vehicle V1 is different from the linear distance L0. In this situation, therefore, the estimation that the actual distance is different from the linear distance L0 made by the estimator 14 is certified, and the linear distance L0 calculated by the linear distance calculator 13 is not provided to the driver. In this situation, for example, a hazard massage "stopping car ahead" is indicated together with a triangular warning sign in the information provider 8 as an indicator or a display, but the distance to the stalled vehicle V1 is not indicated in the information provider 8.

Then, when the distance from the vehicle V0 to the stalled vehicle V1 is reduced shorter than the reference distance (e.g., reduced to 50 meters), the first condition is no longer satisfied and hence the estimation made by the estimator 14 is not certified. Consequently, the provision of the information about the distance from the vehicle V0 to the stalled vehicle V1 to the driver is permitted. In this situation, therefore, the hazard massage "stopping car ahead" and a distance to the stalled vehicle "50 meters" are indicated together with the triangular warning sign in the information provider 8 so that the driver is informed about the distance from the vehicle V0 to the stalled vehicle V1.

In the example shown in FIG. 5, the distance to the stalled vehicle e.g., is indicated "50 meters" is indicated in the information provider 8 at a junction J. Specifically, FIG. 5 shows an example in which the vehicle V0 merges into a main lane R2 of a highway from a general road via a rampway R1. As illustrated in FIG. 5, the rampway R1 curves with respect to the main lane R2 and hence the linear distance L0 from the vehicle V0 to the stalled vehicle V1 is reduced before the vehicle V0 merges into the main lane R2. However, since the rampway R1 curves toward the junction J, the actual distance from the vehicle V0 to the stalled vehicle V1 in this situation is longer than the linear distance L0. In this situation, the actual distance from the vehicle V0 to the stalled vehicle V1 may not be obtained, and the estimator 14 estimates that the actual distance from the vehicle V0 to the stalled vehicle V1 is significantly different from the linear distance L0 from the vehicle V0 to the stalled vehicle V1. In this situation, therefore, the information about the distance to the stalled vehicle V1 is not indicated in the information provider 8. In other words, the wrong information about the distance to the stalled vehicle V1 is not provided to the driver.

As described, once the estimation made by the estimator 14 is certified, such estimation is maintained until the provision of the information about the distance to the stalled vehicle V1 to the driver is permitted, or until the stalled vehicle V1 is no longer detected and the control is terminated. For example, given that the rampway R1 has a loop section, an azimuth of the vehicle V0 will change 360 degrees or more when passing through the rampway R1. Likewise, given that the rampway R1 has a winding section, the azimuth of the vehicle V0 will change significantly in both sides. In those cases, although the azimuth of the vehicle V0 will temporarily coincide with the azimuth of the stalled vehicle V1, the estimation that the actual distance is significantly different from the linear distance L0 is maintained. In those cases, therefore, the wrong information about the distance to the stalled vehicle V1 is not provided to the driver.

Figure 6:
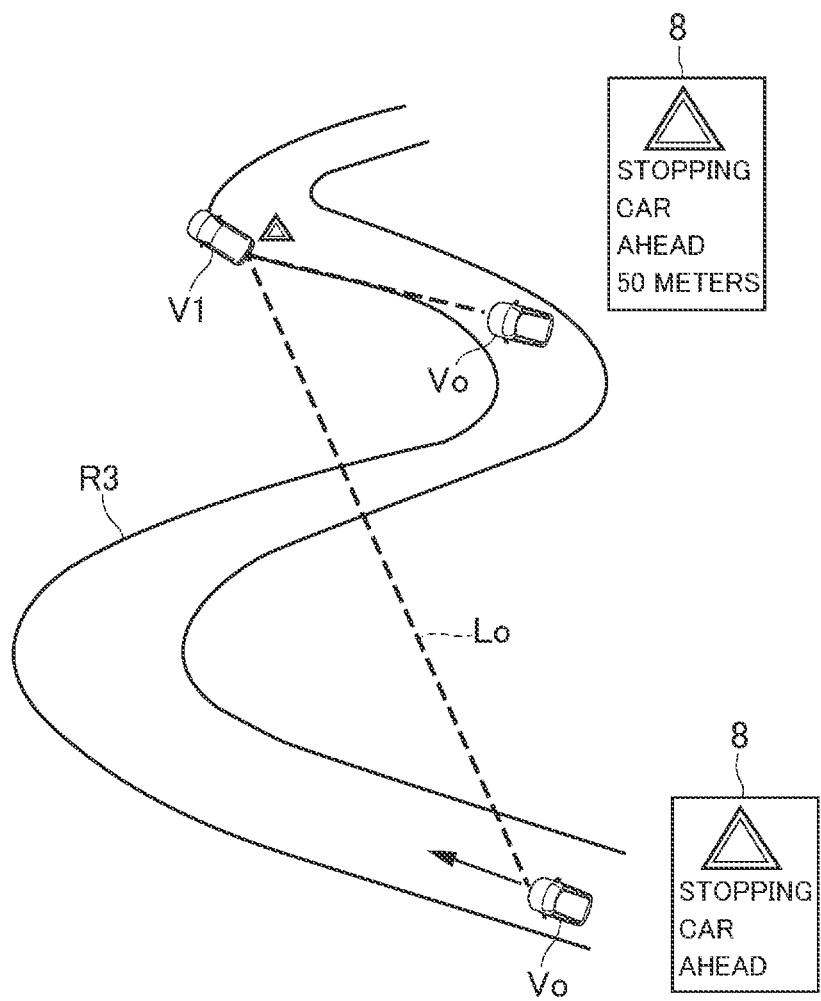
FIG. 6 is a schematic illustration showing an example of providing information about a distance to a stalled vehicle to a driver when the vehicle travels over a winding road.

Turning to FIG. 6, there is shown another example of a situation to provide the information about the distance from the vehicle V0 to the stalled vehicle V1, in which the stalled vehicle V1 is located on a winding road R3. In the example shown in FIG. 6, before the vehicle V0 comes close to the stalled vehicle V1, a determination that the linear distance L0 to the stalled vehicle V1 is longer than the reference distance is made, and a change in a running condition of the vehicle V0 is greater than the criterion. In this situation, therefore, the estimation that the actual distance to the stalled vehicle V1 is different from the linear distance L0 to the stalled vehicle V1 is certified. In the situation shown in FIG. 6, specifically, the number of operations (i.e., a frequency) of the steering wheel is greater than the threshold value, and a change in the azimuth of the vehicle V0 or an accumulated value thereof is greater than the threshold value. In addition, since the vehicle V0 is decelerated when entering corners and accelerated when entering the corners, a change in a speed or an acceleration of the vehicle V0 or an accumulated value thereof is also greater than the criterion value. Consequently, the estimator 14 estimates that the actual distance from the vehicle V0 to the stalled vehicle V1 is different from the linear distance L0 from the vehicle V0 to the stalled vehicle V1. In this situation, therefore, the provision of the information about the distance to the stalled vehicle V1 is inhibited. Specifically, the hazard massage "stopping car ahead" is indicated together with the triangular warning sign in the information provider 8, but the distance to the stalled vehicle V1 is not indicated in the information provider 8.

Then, when the distance from the vehicle V0 to the stalled vehicle V1 is reduced shorter than the reference distance (e.g., reduced to 50 meters), the first condition is no longer satisfied and hence the estimation made by the estimator 14 is not certified. Consequently, the provision of the information about the distance from the vehicle V0 to the stalled vehicle V1 to the driver is permitted. In this situation, therefore, the hazard massage "stopping car ahead" and a distance to the stalled vehicle "50 meters" are indicated together with the triangular warning sign in the information provider 8 so that the driver is informed about the distance from the vehicle V0 to the stalled vehicle V1.

In the case of certifying the above-explained estimation based on a change in a running condition of the vehicle, such estimation is not made based on azimuth angles of the vehicles V0 and V1. Therefore, such estimation will not be uncertified during approaching of the vehicle V0 toward the stalled vehicle V1 through the winding road R3, even if the azimuth of the vehicle V0 temporarily coincides with the azimuth of the stalled vehicle V1. In this case, therefore, the linear distance L0 which is different from the actual distance will not be provided to the driver.

Although the above exemplary embodiments of the present disclosure have been described, it will be understood by those skilled in the art that the present disclosure should not be limited to the described exemplary embodiments, and various changes and modifications can be made within the scope of the present disclosure. For example, the driver assist system may also provide information about a distance to any kind of detectable obstructive factor such as a construction site, a fallen object a forerunning vehicle and so on.

What is claimed is:

1. A driver assist system that provides a driver of a vehicle to which the driver assist system is applied with information about existence of an obstacle being located ahead of the vehicle and whose positional information can be detectable, comprising:
a controller that controls provision of the information to the driver, the controller configured to:
collect the information about the existence of the obstacle by inter-vehicle communication;
calculate a linear distance from the vehicle to the obstacle based on positional information of the vehicle and positional information of the obstacle;
estimate that an actual distance from the vehicle to the obstacle is different from the linear distance;
inhibit provision of the information about a distance from the vehicle to the obstacle to the driver, when the controller estimates that the actual distance is different from the linear distance; and
provide information about the obstacle other than the distance from the vehicle to the obstacle to the driver, wherein the obstacle is a stalled vehicle, and
wherein the information about the obstacle other than the distance from the vehicle to the obstacle includes a reasons of stoppage of the stalled vehicle.

2. The driver assist system as claimed in claim 1, wherein the controller is configured to certify an estimation that the actual distance is different from the linear distance when an angle between an orientation of the vehicle and a straight line connecting the vehicle and the obstacle is equal to a reference angle or wider.

3. The driver assist system as claimed in claim 2, wherein the controller is further configured to maintain the estimation that the actual distance is different from the linear distance until the linear distance is reduced shorter than a reference distance.

4. The driver assist system as claimed in claim 1, wherein the obstacle includes another vehicle whose azimuth as an orientation thereof is detectable, and
the controller is further configured to certify an estimation that the actual distance is different from the linear distance if an angle between an azimuth of the vehicle and the azimuth of the obstacle is equal to a reference angle or wider.

5. The driver assist system as claimed in claim 1, wherein the controller is further configured to certify an estimation that the actual distance is different from the linear distance when the linear distance is equal to a reference distance or longer, and a change in a running condition of the vehicle exceeds a criterion.

6. The driver assist system as claimed in claim 5, wherein the change in the running condition includes a change in an azimuth of the vehicle, a change in a speed of the vehicle, the number of operations or frequency of operations of a steering wheel, and the number of operations or frequency of operations of a blinker.

7. The driver assist system as claimed in claim 1, wherein the information about the obstacle other than the distance from the vehicle to the obstacle includes information about another vehicle.

8. The driver assist system as claimed in claim 1, wherein the information about the obstacle other than the distance from the vehicle to the obstacle includes the existence of the obstacle.

9. A driver assist system that provides a driver of a vehicle to which the driver assist system is applied with information about existence of an obstacle being located ahead of the vehicle and whose positional information can be detectable, comprising:
a controller that controls provision of the information to the driver, the controller configured to:
collect the information about the existence of the obstacle by inter-vehicle communication;
calculate a linear distance from the vehicle to the obstacle based on positional information of the vehicle and positional information of the obstacle;
estimate that an actual distance from the vehicle to the obstacle is different from the linear distance;
inhibit provision of the information about a distance from the vehicle to the obstacle to the driver, when the controller estimates that the actual distance is different from the linear distance; and
provide information about the obstacle other than the distance from the vehicle to the obstacle to the driver,
wherein the obstacle is a stalled vehicle, and
wherein the information about the obstacle other than the distance from the vehicle to the obstacle includes a type of the stalled vehicle.

* * * * *